United States Patent [19]

Goo

[11] Patent Number: 4,817,950

[45] Date of Patent: Apr. 4, 1989

[54] VIDEO GAME CONTROL UNIT AND ATTITUDE SENSOR

[76] Inventor: Paul E. Goo, 1188 Bishop, #1905, Honolulu, Hi. 96813

[21] Appl. No.: 47,129

[22] Filed: May 8, 1987

[51] Int. Cl.⁴ .......................... A63B 71/00; A63F 9/00; H01H 19/00

[52] U.S. Cl. .................... 273/148 B; 273/DIG. 28; 273/1 GC; 200/6 A; 200/52 A; 200/DIG. 23; 272/146

[58] Field of Search ............... 200/5 R, 6 A, 86.5, 200/6 R, 52 A, 61.1, 61.11, 61.83, 153 A, DIG. 23; 273/148 B, DIG. 28, 1 GC, 1 GF, 58 F; 272/146, 56, 111; 434/29, 60

[56] References Cited

U.S. PATENT DOCUMENTS

| | | | |
|---|---|---|---|
| 1,203,220 | 10/1916 | Macy | 200/52 A |
| 1,891,993 | 12/1932 | Larson | 200/52 A |
| 2,714,007 | 7/1955 | Jordan | 272/146 |
| 2,804,123 | 8/1957 | Kling | 272/56 |
| 2,978,243 | 4/1961 | Gabrielson | 272/146 |
| 3,781,931 | 1/1974 | Knickerbocker | 272/56 |
| 3,975,722 | 8/1976 | Adler et al. | 200/61.83 |
| 4,124,787 | 11/1978 | Aamoth et al. | 273/148 B |
| 4,425,488 | 1/1984 | Moskin et al. | 200/153 A |
| 4,488,017 | 12/1984 | Lee | 200/86.5 |
| 4,660,828 | 4/1987 | Weiss | 200/6 A |
| 4,693,476 | 9/1987 | Talamantez | 273/110 |

FOREIGN PATENT DOCUMENTS 3001768 7/1981 Fed. Rep. of Germany ... 273/DIG. 28

*Primary Examiner*—Richard C. Pinkham
*Assistant Examiner*—Gary Jackson
*Attorney, Agent, or Firm*—Seiler, Quirk & Tratos

[57] ABSTRACT

A surfing video game in which a surfing figure on a monitor moves over simulated waves to gain playing rewards is controlled by a foot-actuated surfboard simulator. The simulator has a horizontally mounted elongate surfboard having a suspension system consisting of a fulcrum member adapted to support the board to permit tilting in all directions, and a biasing system mounted annularly to the fulcrum which tends to maintain the board in a horizontal position and to dampen tilting movement of the board. An attitude sensor and switch module is mounted on the controller and consists of a gravity-actuated closure member, such as a pendulum or ball bearing, having a common electrical contact and positioned to engage one or more of a plurality of equally spaced electrical contacts located around the periphery of the closure member.

11 Claims, 3 Drawing Sheets

VIDEO GAME CONTROL UNIT AND ATTITUDE SENSOR

BACKGROUND OF THE INVENTION

This invention relates to a video game including a foot-actuated control unit which may have the shape of a surfboard. In addition, a portion of the invention relates to an attitude sensing device which determines the tilt angle of the platform, and opens and closes a plurality of electrical contacts enabling a signal input to a computer control unit.

Video game control units, commonly called "joysticks", are well known in the prior art for producing output signals corresponding to the attitude of the joystick, which may be moved along an x-y path to control the movement of a display element on the video terminal. Generally, the control units are adapted to provide signals corresponding to radial movements around a circumference in 45° increments; i.e., from any different location on the screen, the movable figure can move in any of eight different directions depending upon the attitude of the joystick. Generally speaking, joysticks are hand-operated and involve a control element which is movable against a deformable member which permits the element to make contact with one or more switches, thereby permitting completion of a circuit which controls the attitude of the control element. Sometimes the control unit pushes against a series of microswitches installed in the unit causing electrical contact to be made in the manner of pushbutton switch. Frequently, the switches are formed as an array of circuit segments on a printed circuit board. Foot-operated control units are known, and one embodiment of such a unit is found in Lee, U.S. Pat. No. 4,488,017. This patent discloses a foot-operated unit resembling a bathroom scale in which movement of the operator's feet serves to tilt the platform to close certain circuit segments on a printed circuit board in the same manner as a hand-operated controller. Another example of a typical hand-operated video controller is disclosed in Guenther, U.S. Pat. No. 4,461,935.

Other relevant foot-operated amusement devices include a surfing simulator disclosed in Pifer, U.S. Pat. No. 3,863,915; this patent shows a surfboard mounted above a base and suspended by fore and aft mounted pairs of coil springs. An exercising device consisting of a balance board supported by an inverted dome, with a plurality of ground-supported damping members made from foam rubber used to resist tilting of the platform, is disclosed in Francke, U.S. Pat. No. 4,491,318.

In its broadest sense, the invention contemplates a video game in which the game player is able to move a figure of a surfer on a video screen by standing on a simulated surfboard and moving the board with his feet; movements of the board from side to side and forward and backward are translated instantaneously to corresponding movements of the surfboard shown on the video screen, allowing the surfing figure to be maneuvered around obstacles, and up and down waves. Key to the operation of the video game controller is the suspension system, which consists of a ground-supported inverted dome which is used as a fulcrum for movement of the board to simulate the movement of a surfboard, and a biasing system consisting of a doughnut-shaped, resilient member mounted annularly around the fulcrum.

Another key element of the system is an attitude sensor/switch which mounts to the controller and substantially instantaneously senses the tilt attitude of the board, and closes one or more switches to activate circuitry which communicates the attitude to the computer. This control device consists of a gravity-actuated switch member which tilts along with the board and engages one or more of a plurality of electrical contacts located around the periphery of the attitude-sensing unit. This sensor is very simple and inexpensive to build, has only one moving part, and is very durable. This switch eliminates the constant destructive pressure needed to generate conventional control units that often collapses switches, fractures circuit boards, and wears contact points. The teetering of the copper pendulum is dependent only on its own weight and the attitude of the board. The controller of the invention is also extremely responsive, permitting very rapid response for controlling character movement. This factor is attributable to the very small "throw" or distance between the pendulum and the contacts, allowing very rapid making and breaking of switch connections an a very smooth movement of the display member on the terminal screen.

Accordingly, it is an object of the present invention to provide a system for a video surfing game which is actuated by a game player moving his feet along a simulated surfboard. It is another object of the invention to provide a suspension system for a foot-activated video game controller which is inexpensive and durable, yet accurate. It is yet a further object of the invention to provide a sensor unit for automatically determining the tilt attitude of a platform by gravity, and for closing one or more switches to activate circuitry to translate the movement of the board along an x-y plane to a video screen. These and other objects of the invention are accomplished by means of the system of the invention, a detailed description of which follows herein.

BRIEF SUMMARY OF THE INVENTION

A foot-operated video game controller consists of a board mounted parallel to a supporting surface supported by a suspension system biased to maintain the board in a horizontal position. The suspension system has a fulcrum surrounded by a resilient member, such as an inner tube of a tire or an annular ring of resilient foam, which acts to dampen tilting movement of the platform and to return the platform to a horizontal position. An electrical switch having a gravity-actuated closure member which is permanently connected to a common electrical contact, and which moves responsive to the tilt of the platform to contact one or more of a plurality of switch contact points spaced equally about the periphery of a switch housing. In a particularly preferred embodiment of the tilt switch, the closure means comprises a bell-shaped pendulum which is suspended from a support member which acts as the common contact, and the pendulum swings by means of gravity to contact the various switch contacts mounted around its periphery.

BRIEF DESCRIPTION OF THE DRAWINGS

The invention is best understood with reference to the drawings, in which.

DETAILED DESCRIPTION OF A PREFERRED EMBODIMENT

Figure 1:
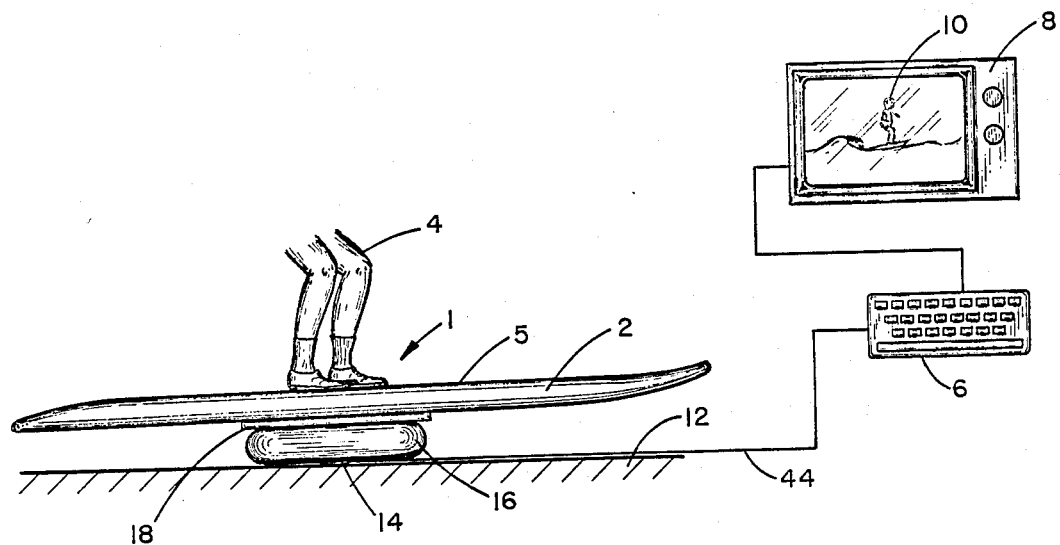
FIG. 1 is a partial side view of a player mounted on a video controller of the invention, showing the translation of the motion to a video screen.
Figure 2:
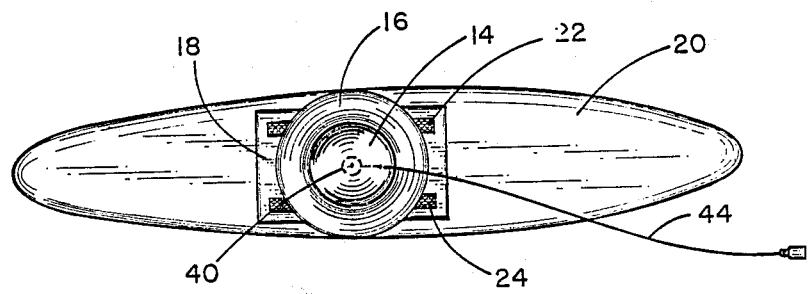
FIG. 2 is a bottom view of a controller of the invention.

Referring first to FIG. 1, a surfing simulator 1 consists of a generally flat rigid platform 2 mounted substantially parallel to and above the ground or floor 12. The platform preferably resembles a surfboard, being generally elongated and slightly oval as shown in FIG. 2, so as to give the game player the impression of actually moving along a real surfboard. The board may be fabricated from any rigid structural material, such as wood, metal, or plastic, and may be an actual production surfboard mounted on the suspension system. Preferably, the board has a length at least three times the width, preferably four times the width. A user 4 operates the simulator by placing his feet on the top surface 5 of the surfboard and by moving his feet and shifting his weight in such a way as to tilt the board from side to side and back to front.

The surfboard simulator is electrically connected to a computer 6 via line 44, which is in turn connected to a video monitor 8. Through software controlled by the computer, a miniature surfing FIG. 10 is moved along the screen along x-y coordinates corresponding to the movement of the surfing simulator actuated by the user 4.

Figure 3:
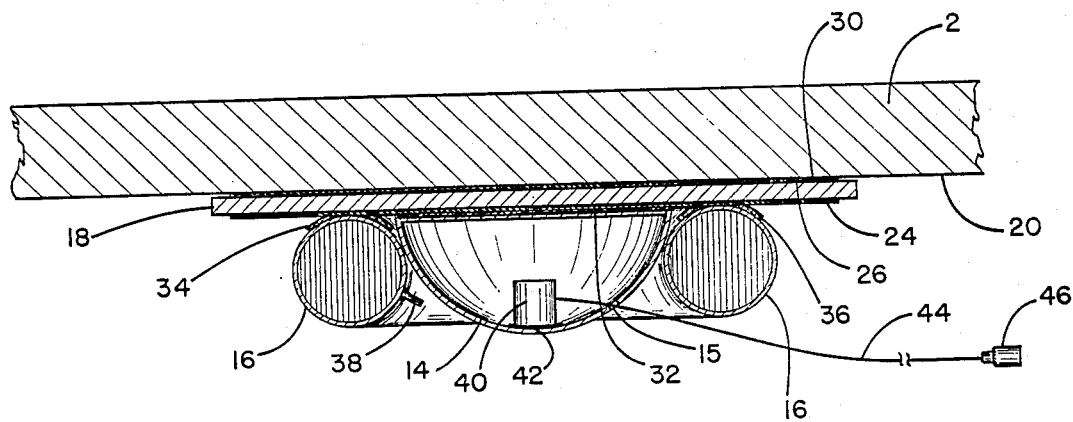
FIG. 3 is a partial side section view of the controller of the invention showing the attitude sensing device.

The surfing simulator or game controller 1 is mounted on a base comprising an inverted dome-shaped fulcrum member 14, which permits the surfboard to roll in all directions with equal ease. The fulcrum member must be rigid and weight-supportive, and is preferably convex with a circular horizontal cross-section. A doughnut-shaped biasing suspension member 16 is mounted annularly to the fulcrum member. As shown in FIGS. 2 and 3, the suspension member is an inflatable rubber tire having a 16" OD and 8" ID, and has a thickness that approximates the radius of the hemispherical fulcrum. The tire is a conventional commercially available model, such as Bridgestone 53×8", and is inflated through valve stem 38 to a pressure of from about 10 to about 20 psi.

Figure 4:
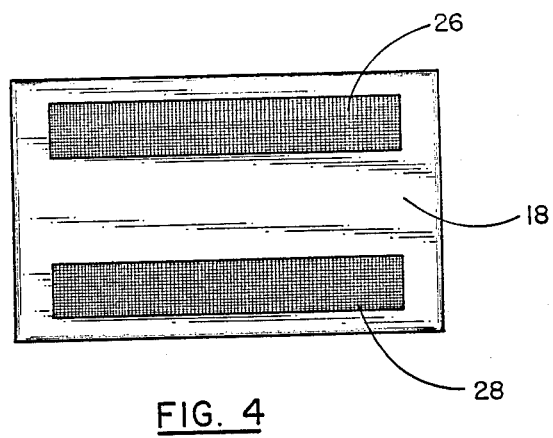
FIG. 4 is a top view of a mounting board for the controller.

As shown in FIGS. 2-4, the mounting base for the platform 2 is an assembly comprising several parts. A flat board 18 serves as a mounting means for the various components of the controller assembly. A pair of parallel strips of interengaging fastening means components (as shown, Velcro ® strips) are mounted by adhesive on both the top and bottom surfaces of the mounting board 18. A spaced pair of Velcro ® strips 22 and 24 are mounted on the bottom surface 20 of the platform, as shown in FIG. 2, and a similar pair of strips 26 and 28 are attached on the top of the mounting board as shown in FIG. 4. An interengaging strip 30 is similarly attached to the bottom surface 20 of the surfboard, and an additional mating strip 32 extends across the top surface 48 of the hemisphere 14. Accordingly, the mounting board 18 serves as a fastening component for a number of the controller system members, and the use of Velcro ® fasteners enables easy removal of the components in the event that repair or replacement is necessary, yet provides a solid, motion-free fit which firmly binds the components during use. The Velcro ® fastening means disclosed herein are commercially available hook-and-loop type interengaging fasteners; however, any similar adhesive-type fastening means may be used to connect the various components of the invention.

The tire 16 is also connected to the underside of the mounting board by means of a pair of Velcro ® strips 34 and 36 adhesively attached to the upper surface of the tire as shown in FIG. 3. These strips attach to the Velcro ® strip 24 on the bottom of the mounting board. Corresponding strips (not shown) attach another portion of the tire to the parallel strip 22 on the bottom of the mounting board.

An attitude sensor and switch module 40 mounts at a bottom portion of the inside of the fulcrum unit 14 as shown in FIG. 3. The unit is removable, and attaches by means of adhesive 42. The electrical components of the unit are attached to the computer by means of an electrical conduit 44 carrying five wires and a plug 46 for attachment to computer 6. The conduit extends from the switch module through bore 15 in the fulcrum.

Figure 5:
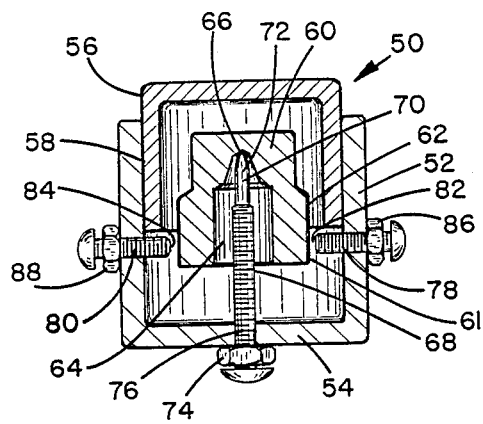
FIG. 5 is a side section view of a preferred embodiment of the attitude sensing switch.
Figure 6:
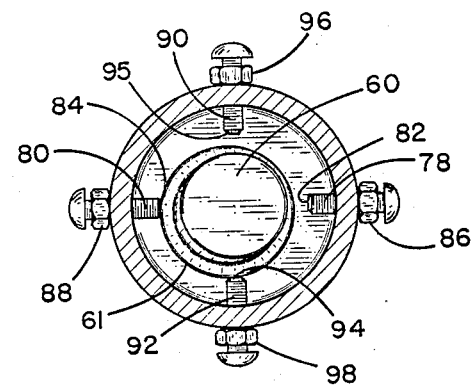
FIG. 6 is a top view of the switch of FIG. 5 with the cap removed.
Figure 7:
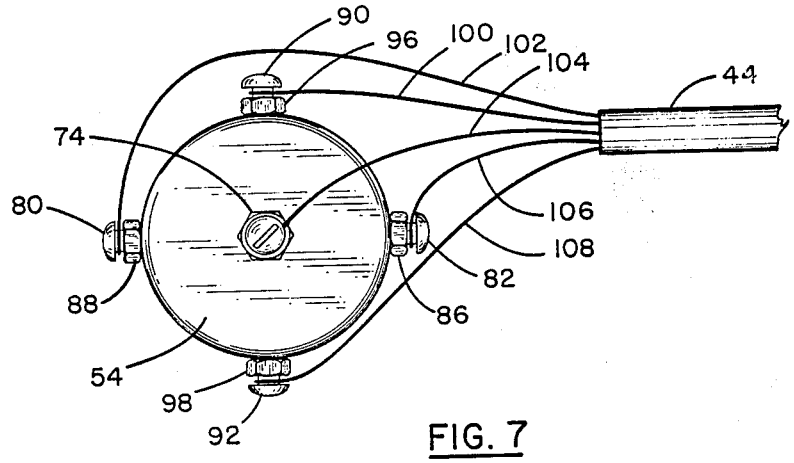
FIG. 7 is a bottom view of the switch of FIG. 5.

A preferred embodiment of the sensor is shown in FIGS. 5-7. An attitude sensor 50 comprises a hollow cylindrical casing 52 fabricated from plastic, such as ABS or polyvinylchloride, or metal, and has a bottom wall 54, the walls forming a switch chamber 55. The casing is covered by an inverted hollow cylindrical cap 56 having sidewalls 58 which frictionally engage the interior of the walls of the cylindrical casing 52. The cap precludes dust and moisture from entering the housing. The switch closure member of this embodiment is a generally bell-shaped pendulum member 60 mounted concentrically interior of the casing which has a hollow cavity or bore 62 centrally located and opening to the bottom of the pendulum. The bore has a point 66 at its internal apex. A pendulum mount 68 consists of a pointed threaded screw which extends inwardly through a bore 76 in the bottom wall 54 of the casing. The term "pendulum" as used herein refers to a suspended member having the ability to swing freely by gravity in any horizontal direction from a suspension point. A non-threaded portion 70 of the shaft of the screw terminates in an upper pointed portion 72 which engages the apex of the cavity in the pendulum, permitting the pendulum to swing in any direction depending upon the tilt attitude of the sensing unit. An adjusting nut 74 is used to fasten the screw into the sensing unit and to adjust the height of the pendulum. The pendulum is made from a conductive metal, such as brass, copper, or steel.

A plurality of electrical contacts 78, 80, 90, and 92 are located at 90° intervals around the internal periphery of the sensing unit. These contacts consist of metal (e.g., copper) screws which extend through radial bores in the cylindrical walls of the casing 52, and terminate in contact points 82, 84, 94, and 95. Alternatively, the contacts may be raised contact points on a preprinted circuit surrounding the interior of the housing. The contact points engage the external peripheral surface 61 of the pendulum when the sensor tilts, thus creating an electrical circuit which extends from the contact through the pendulum and the pendulum mount 68. Accordingly, current will pass through the pendulum mount and through any of the contacts 78, 80, 90, and 92 if engaged by the pendulum. As shown in FIG. 6, depending on the tilt angle the pendulum may engage two of the contact members at the same time, thereby providing a circuit through both contacts. This is read by the computer as a tilt direction midway between the coordinates of the two contacts being engaged by the pendulum. The circuitry for transmitting tilt angle to the computer is simple and conventional, being used in most commercially available joystick applications.

Of course, the controller is not limited to being four contacts, but may have 6, 8, or more, thus providing a visually more continuous movement rather than being limited to the more familiar and conventional 45° movements.

FIG. 7 shows attachment of the sensing and switching unit to a plurality of electrical conduit lines 100, 102, 104, 106, and 108. As shown, the lines are attached to the sensing module by fastening the screws 80, 82, 90, and 92 to the securing nuts 88, 86, 96, and 98, respectively. The common line 104 is attached to the screw 68 extending through the bottom wall 54 of the module by means of fastening nut 74. All of the electrical lines are contained in a conduit 44 which attaches to the computer as shown in FIG. 1.

Figure 8:
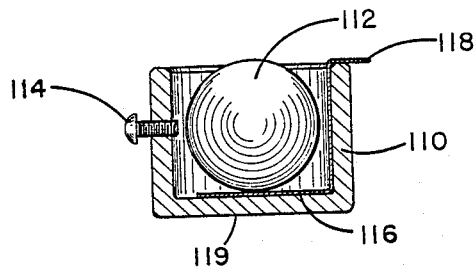
FIG. 8 is a side section view of another embodiment of an attitude switch.
Figure 9:
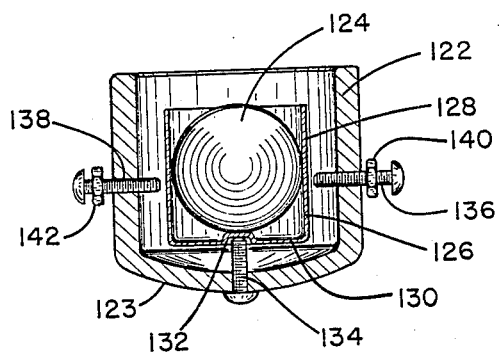
FIG. 9 is a side section view of another embodiment of the attitude sensor switch.

FIGS. 8 and 9 show alternate embodiments of the sensor/switching modules of the invention. Both of the embodiments are simple gravity-operated switches actuated by a weighted ball mounted in a cylindrical container. In FIG. 8, the switch comprises a cylindrical housing 110 having an open top and an inside diameter of about 1". A stainless steel ball bearing 112 having an outside diameter of about ⅞" is mounted inside the housing. An electrical contact 116 consisting of a flat copper strip having a width of about ⅛" extends across substantially the width of the inside bottom floor 119 of the housing, and extends up the wall and over the upper edge to terminate in a contact point 118 for attachment of the common electrical line. Four equally spaced screws, one of which is shown in FIG. 8 as contact 114, extend through the housing wall and serve as the contact points in the same manner as is shown in the preferred switch embodiment of FIGS. 5-7. The ball bearing rests on the common contact 116, and as the housing tilts, an electrical connection is made through one or two of the contact screws 114, thereby indicating the attitude of the switch in the same manner previously discussed.

The attitude switch embodiment shown in FIG. 9 also has a generally cylindrical housing 122 having an open top and a slightly convex bottom wall 123. A second hollow cylinder 126, fabricated from copper, has a cylindrical side wall 128 and a generally flat bottom wall 130 having a centrally located circular depression 132 to receive the end of contact screw 134. The contact screw extends inwardly through the center of the bottom housing wall 123, and serves as a fulcrum for tilting of the cylinder from side to side as the housing moves away from vertical. A steel ball bearing 124, having an outside diameter substantially equal to the inside diameter of the cylinder 126, is frictionally mounted inside the copper cylinder and adds weight thereto, assuring a rapid response of the tilting of the copper cylinder upon tilting of the housing. Opposing contact screws 136 and 138 are mounted radially through the housing wall and are fastened in place by nuts 140 and 142 in a manner similar to the orientation shown in FIG. 6; the other two contact screws mounted at 90° angles to contacts 136 and 140 are not shown in this drawing but are oriented as shown in the embodiment of FIG. 6. As the housing tilts, the walls of the brass cylinder 126 engage one or two of the screw contacts, thus completing a circuit between the common contact 134 and the other contact through the wall of the copper cylinder. The vertical wall of the cylinder provides an excellent electrical contact, and being a vertical wall within the housing, does not require accurate adjustment of the contact levels of the embodiment shown in FIG. 8. The embodiment shown in FIG. 8 is highly functional, however, the contacts must be adjusted to the exact same elevation above the floor of the housing in order to contact the spherical ball bearing at the same height around the circumference of the bearing.

As is apparent from the specific examples shown herein, the switch closure member is a weighted, electrically conductive object which mounts between a plurality of spaced contacts located around the periphery of the switch chamber. The closure member is free to move in a horizontal direction responsive to the force of gravity to contact one or more of the contacts. A mercury switch may be used if desired but is not preferred.

Returning to FIG. 3, the suspension system for the foot-operated controller of the invention consists basically of a fulcrum and resilient biasing means for maintaining the board in a horizontal position. The biasing or damping means are preferably the inflatable tire as shown in the drawings; the tire provides equal support all of the way around the periphery of the semicircular fulcrum, and can also be adjusted to provide a precisely desired damping effect simply by adjusting the inflation of the tire. In other words, if a large or heavy person were to use the board, or if the game were to be made easier, the inflation of the tire could be increased; conversely, if a child used the board, a lesser degree of inflation might be more desirable. However, it is also possible to substitute other resilient material, such as sponge rubber or even mechanical springs, to provide the biasing effect of the tire. Also, while the shape of the fulcrum has been shown as hemispherical, the particular object attached to the underside of the board may be lesser or greater than a hemisphere, and may be non-spherical in shape, provided that the contact point with the ground provides a point or surface which enables the board to tilt in any direction equally around the circumference of the fulcrum. In other words, the fulcrum must move in any direction with equal ease. Also, while the specific construction of the foot-operated controller shows a mounting board 18 for fastening the various components of the controller, the use of the mounting board is optional and in actuality the remaining components can be attached without the board.

The control switch may be connected to any computer adapted to receive signals from a joystick controller; the signals received by the computer are the same as the signals from any other joystick. Obviously, any type of monitor may be used. For maximum effect of the game, it is preferred to have a type of game in which the figure portrayed on the monitor and controlled by the foot-operated controller represents a surfer. The surfing figure is then moved through various obstacles, such as slalom gates or large waves, to score points. Wipeouts in the waves, or collisions with other objects or other surfers, cause scoring detriments to the player.

The controller of the invention and the game of the invention are used in a conventional manner. ° When the electrical components of the game have been actuated, whether by insertion of a coin into a coin-receiving unit or simply by turning the unit on, the user mounts the surfing simulator and shifts his weight forwardly and rearwardly, and from side to side, thereby tilting the board against the suspension system and away from the horizontal attitude. As the board tilts, the switch mechanism mounted in the inverted dome member is actuated by the movement of the pendulum member, which rapidly opens and closes switches corresponding to the tilt angle of the board. Accordingly, movements of the board are displayed by corresponding movements of the figure on the screen, enabling the game player to control the surfing figure around obstacles and up and down waves as they appear on the screen. The controller may of course be used to control any game which is playable by a joystick, and affords the player a novel method of controlling the game as well as providing good exercise and improvement of balance control. Accordingly, the game controller of the invention has a multiple purpose.

It is also obvious that the attitude sensing switch of the invention may be used for other purposes than controlling video games. The switch may be used to assist in translating movement to a chart, or to manipulate another mechanical device such as a robot or mechanical figure that will duplicate the motion taking place on the control board. As indicated previously, the foot-operated control unit may also control movements or processes other than video games; for example, the board can be used as an exerciser, and the amount of exercise can be recorded by the controller. While the use of the invention has been described as the actuation of movement of the board with the user's feet, the player may actually mount the board in a prone position, sitting, standing, or kneeling, as is done in the actual sport of surfing, shifting the weight to move the controller in the same manner as would be done to manipulate a surfboard on the water.

While the attitude-sensing switch has been shown to be electrically connected to a computer via conventional electrical wiring, it is of course possible to transmit the switching signals electronically wirelessly by means of radio or light waves, thus obviating the necessity for electrical cable.

Accordingly, it will be apparent to those skilled in the art that a number of modifications and adaptations may be made to elements of the invention, several specific embodiments of which have been disclosed herein. These adaptations and modifications may be made within the spirit and scope of the invention; accordingly, the invention should not be limited with respect to the disclosures set forth above, but rather should be measured only by the following claims.

I claim:

1. A video game comprising a video display terminal, computer means electrically connected to the video display terminal, player-actuated signal generating means for sending signals to the computer means comprising a generally horizontal rigid platform capable of supporting the weight of the user and adapted to receive the user's feet, a fulcrum mounted on the platform and adapted to contact a horizontal supporting surface, the fulcrum having a curved exterior surface, biasing means for resisting movement of the platform to highly tilted positions, gravity-actuated switch means for opening and closing a plurality of attitude-related electrical switches responsive to the direction of tilt of the platform, said switch means comprising a housing having an internal peripheral wall, a plurality of discrete first electrical contacts uniformly spaced around the internal peripheral wall, a solid conductive gravity-actuated switch closure member centrally mounted in the housing and freely movable in all lateral directions such that tilting of the housing causes the switch closure member to more by gravity into contact with at least one of the first electrical contracts, and a second electrical contact member adapted to maintain permanent electrical contact with the switch closure member, and transmission means for conveying signals from the electrical switches to the computer means.

2. The video game of claim 1 wherein the closure member comprises a pendulum.

3. The video game of claim 1 wherein the rigid platform has a length at least three times its width.

4. The video game of claim 1 wherein the rigid platform has a length at least three times its width and is generally oval in shape, simulating a surfboard.

5. The video game of claim 1 wherein the fulcrum comprises a rigid, weight-supporting member having a ground-contacting convex surface having a generally uniform curvature with a circular horizontal cross-section.

6. The video game of claim 1 wherein the biasing means comprises a resilient suspension member mounted annularly to the fulcrum.

7. The video game of claim 1 wherein the biasing means comprises an inflatable doughnut-shaped member mounted annularly to the fulcrum.

8. A video game controller comprises a generally rigid horizontal platform capable of supporting the weight of the user and adapted to receive the user's feet, a fulcrum mounted on the platform and adapted to contact a horizontal supporting surface, the fulcrum having a curved exterior surface, biasing means for urging the platform to a horizontal position, gravity-actuated switch means for opening and closing a plurality of attitude-related electrical switches responsive to the direction of tilt of the platform, said switch means comprises a housing having a bottom wall and cylindrical vertical walls forming chamber, at least four electrical contacts equally spaced in a common horizontal plane around an internal periphery of the cylindrical walls, a switch closure member suspended from a mounting point at an upper portion thereof within the chamber, mounting means for suspending the closure member extending axially within the chamber such that the closure member is freely movable by gravity from said mounting point, said mounting means being in electrically conductive contact with the closure member, and electrical conduit means attached to the mounting means, and p1 transmission means for conveying signals from the electrical switches to the computer means.

9. The video game controller of claim 8 wherein the biasing means comprises a circular resilient member having a central opening therein, which member is mounted annularly to the fulcrum.

10. The video game controller of claim 9 wherein the biasing means comprises an inflatable hollow ring-shaped member having a central annular opening and a circular inflated cross-section.

11. The video game controller of claim 8 wherein the fulcrum has a substantially circular horizontal cross-section.

* * * * *